US009712817B1

(12) United States Patent
Cismas

(10) Patent No.: US 9,712,817 B1
(45) Date of Patent: Jul. 18, 2017

(54) LOSSLESS VIDEO CODING SYSTEMS AND METHODS

(71) Applicant: Ovics, Saratoga, CA (US)

(72) Inventor: Sorin C. Cismas, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 410 days.

(21) Appl. No.: 14/183,505

(22) Filed: Feb. 18, 2014

Related U.S. Application Data

(60) Provisional application No. 61/765,261, filed on Feb. 15, 2013.

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/124* | (2014.01) |
| *H04N 19/50* | (2014.01) |

(52) U.S. Cl.
CPC ... *H04N 19/0009* (2013.01); *H04N 19/00569* (2013.01)

(58) Field of Classification Search
CPC ............ H04N 19/0009; H04N 19/00569
USPC ............................................. 375/240
See application file for complete search history.

(56) References Cited

U.S. PATENT DOCUMENTS

| 6,339,616 B1 * | 1/2002 | Kovalev | H04N 19/51 348/699 |
|---|---|---|---|
| 6,654,419 B1 | 11/2003 | Sriram et al. | |
| 7,177,479 B2 | 2/2007 | De Ponti et al. | |
| 7,932,843 B2 | 4/2011 | Demircin et al. | |
| 2004/0213471 A1 * | 10/2004 | De Ponti | H04N 19/13 382/239 |

(Continued)

OTHER PUBLICATIONS

Niedermayer, Michael, "FFV1 Video Codec Specification," available at http://www.ffmpeg.org/~michael/ffv1.html, Sep. 5, 2013.

(Continued)

*Primary Examiner* — Gims Philippe
*Assistant Examiner* — Amir Shahnami
(74) *Attorney, Agent, or Firm* — Meyertons, Hood, Kivlin, Kowert & Goetzel, P.C.

(57) ABSTRACT

In some embodiments, a lossless 2D video decoder includes multiple parallel speculative decoding engines, each performing a sample-determination calculation according to one of several possible context values for the current pixel to be decoded. The actual context depends on a quantized value of a local inter-pixel gradient, which may become available only when an immediately-neighboring pixel has been decoded. A multiplexer selects one of the decoding engine outputs when the immediately-neighboring pixel has been decoded and the actual context becomes available. A sample (e.g. luma and/or chroma) value for the current pixel may be determined according to: a baseline prediction generated by applying a median filter to immediately-neighboring pixels; a context-dependent adjustment dependent on local context statistics; and a delta (difference) value read from a video bitstream. Determining multiple context-dependent adjustments in parallel before the actual context is determined allows decoding one pixel per clock cycle.

20 Claims, 9 Drawing Sheets

(56) References Cited

U.S. PATENT DOCUMENTS

2005/0175250 A1\* 8/2005 Watanabe .............. H04N 19/63
                                                    382/247
2006/0245489 A1\* 11/2006 Tsushima ................ H03M 7/40
                                                    375/240
2009/0141797 A1    6/2009 Jia
2013/0156091 A1\* 6/2013 Li ........................ H04N 19/115
                                                    375/240.01

OTHER PUBLICATIONS

Niedermayer Michael, "FFV1 Video Codec Specification," archive.org indicates a version of the text available at http://www.ffmpeg.org/~michael/ffv1.html, Dec. 6, 2010.

Hugosson, Ola, "Hali-V500 video processor: reducing memory bandwidth with AFBC," available at blogs.arm.com/multimedia/978-mali-v500-video-processor-reducing-memory-bandwidth-with-afbc/, Jun. 10, 2013.

\* cited by examiner

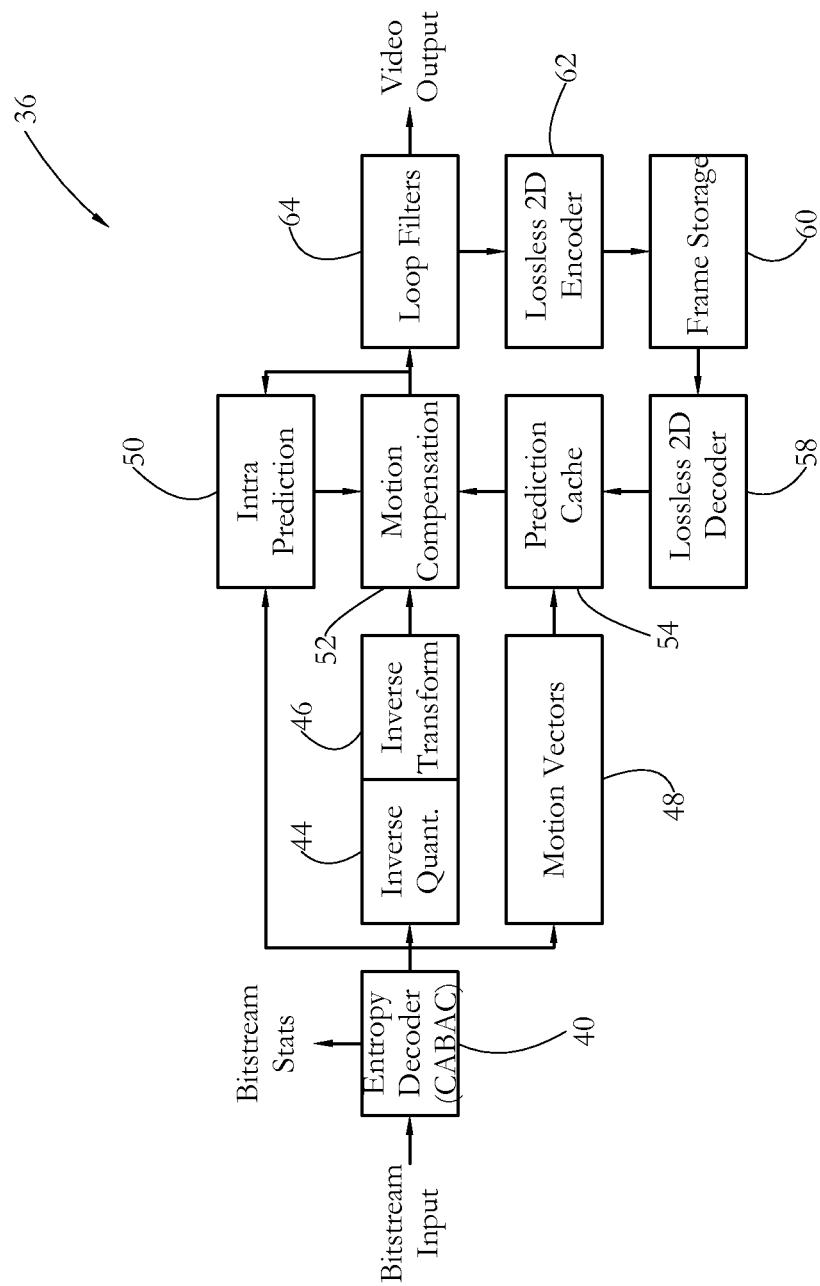
FIG. 2-A

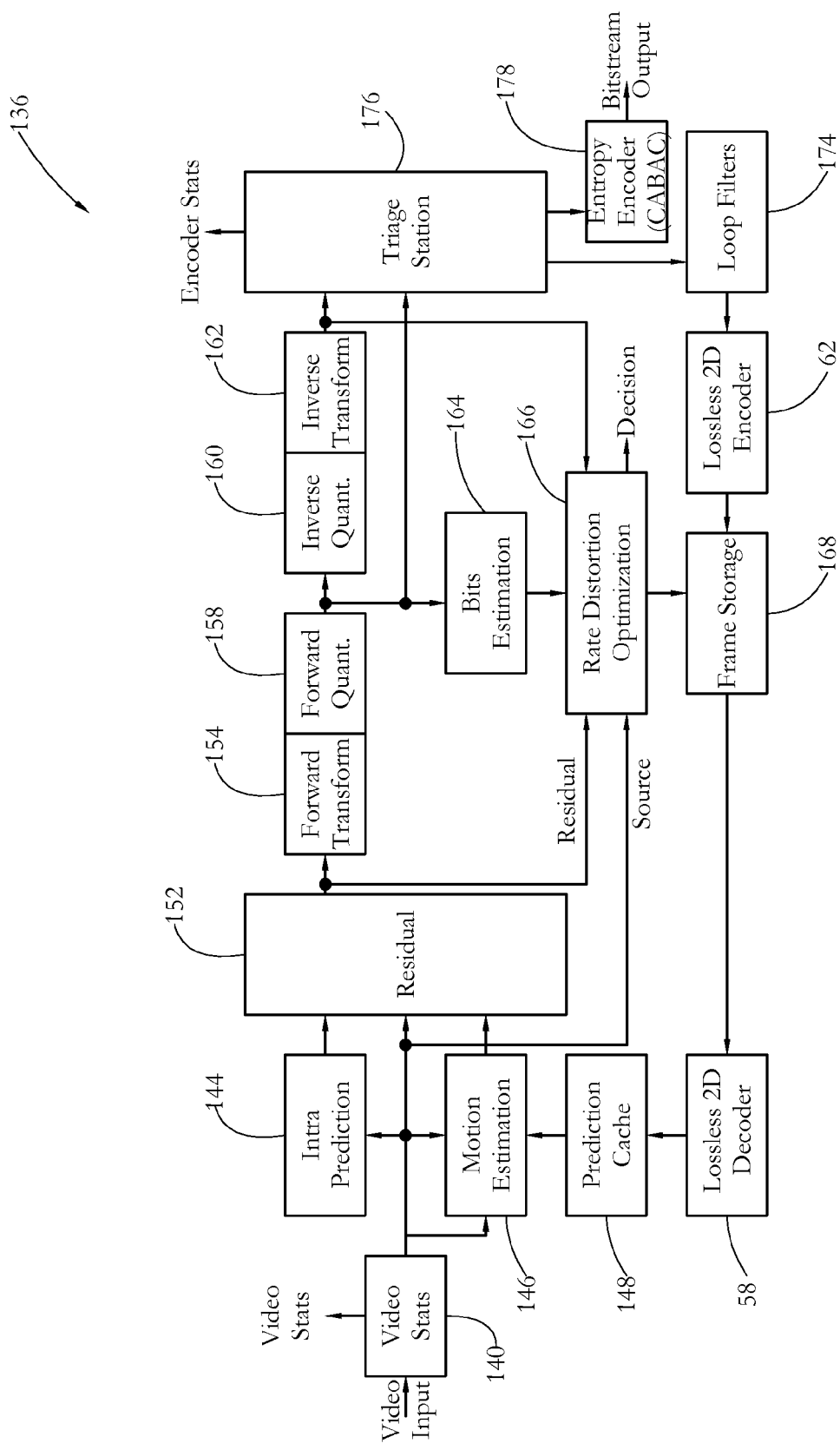
FIG. 2-B

|    | 0  | 1  | 2  | 3  | 4  | 5  | 6  | 7  | 8  | 9  | a  | b  | c  | d  | e  | f  |
|----|----|----|----|----|----|----|----|----|----|----|----|----|----|----|----|----|
| 0  | 0  | 1  | 1  | 1  | 1  | 2  | 2  | 2  | 2  | 2  | 2  | 2  | 2  | 2  | 2  | 2  |
| 10 | 2  | 2  | 2  | 2  | 2  | 2  | 2  | 2  | 2  | 2  | 2  | 2  | 2  | 2  | 2  | 2  |
| 20 | 2  | 2  | 2  | 2  | 2  | 2  | 2  | 2  | 2  | 2  | 2  | 2  | 2  | 2  | 2  | 2  |
| 30 | 2  | 2  | 2  | 2  | 2  | 2  | 2  | 2  | 2  | 2  | 2  | 2  | 2  | 2  | 2  | 2  |
| 40 | 2  | 2  | 2  | 2  | 2  | 2  | 2  | 2  | 2  | 2  | 2  | 2  | 2  | 2  | 2  | 2  |
| 50 | 2  | 2  | 2  | 2  | 2  | 2  | 2  | 2  | 2  | 2  | 2  | 2  | 2  | 2  | 2  | 2  |
| 60 | 2  | 2  | 2  | 2  | 2  | 2  | 2  | 2  | 2  | 2  | 2  | 2  | 2  | 2  | 2  | 2  |
| 70 | 2  | 2  | 2  | 2  | 2  | 2  | 2  | 2  | 2  | 2  | 2  | 2  | 2  | 2  | 2  | 2  |
| 80 | -2 | -2 | -2 | -2 | -2 | -2 | -2 | -2 | -2 | -2 | -2 | -2 | -2 | -2 | -2 | -2 |
| 90 | -2 | -2 | -2 | -2 | -2 | -2 | -2 | -2 | -2 | -2 | -2 | -2 | -2 | -2 | -2 | -2 |
| a0 | -2 | -2 | -2 | -2 | -2 | -2 | -2 | -2 | -2 | -2 | -2 | -2 | -2 | -2 | -2 | -2 |
| b0 | -2 | -2 | -2 | -2 | -2 | -2 | -2 | -2 | -2 | -2 | -2 | -2 | -2 | -2 | -2 | -2 |
| c0 | -2 | -2 | -2 | -2 | -2 | -2 | -2 | -2 | -2 | -2 | -2 | -2 | -2 | -2 | -2 | -2 |
| d0 | -2 | -2 | -2 | -2 | -2 | -2 | -2 | -2 | -2 | -2 | -2 | -2 | -2 | -2 | -2 | -2 |
| e0 | -2 | -2 | -2 | -2 | -2 | -2 | -2 | -2 | -2 | -2 | -2 | -2 | -2 | -2 | -2 | -2 |
| f0 | -2 | -2 | -2 | -2 | -2 | -2 | -2 | -2 | -2 | -2 | -2 | -2 | -1 | -1 | -1 | -1 |

FIG. 7-A ct1(0-255)

|    | 0 | 1 | 2 | 3 | 4 | 5 | 6 | 7 | 8 | 9 | a | b | c | d | e | f |
|----|---|---|---|---|---|---|---|---|---|---|---|---|---|---|---|---|
| 0  | 0 | 1 | 1 | 2 | 2 | 2 | 2 | 3 | 3 | 3 | 3 | 3 | 3 | 3 | 3 | 3 |
| 10 | 3 | 3 | 4 | 4 | 4 | 4 | 4 | 4 | 4 | 4 | 4 | 4 | 4 | 4 | 4 | 4 |
| 20 | 4 | 4 | 4 | 4 | 4 | 4 | 4 | 4 | 4 | 4 | 4 | 4 | 4 | 4 | 4 | 4 |
| 30 | 4 | 4 | 4 | 4 | 4 | 4 | 4 | 4 | 4 | 4 | 4 | 4 | 4 | 4 | 4 | 4 |
| 40 | 4 | 4 | 4 | 4 | 4 | 4 | 4 | 4 | 4 | 4 | 4 | 4 | 4 | 4 | 4 | 4 |
| 50 | 4 | 4 | 4 | 4 | 4 | 4 | 4 | 4 | 4 | 4 | 4 | 4 | 4 | 4 | 4 | 4 |
| 60 | 4 | 4 | 4 | 4 | 4 | 4 | 4 | 4 | 4 | 4 | 4 | 4 | 4 | 4 | 4 | 4 |
| 70 | 4 | 4 | 4 | 4 | 4 | 4 | 4 | 4 | 4 | 4 | 4 | 4 | 4 | 4 | 4 | 4 |
| 80 | -4| -4| -4| -4| -4| -4| -4| -4| -4| -4| -4| -4| -4| -4| -4| -4|
| 90 | -4| -4| -4| -4| -4| -4| -4| -4| -4| -4| -4| -4| -4| -4| -4| -4|
| a0 | -4| -4| -4| -4| -4| -4| -4| -4| -4| -4| -4| -4| -4| -4| -4| -4|
| b0 | -4| -4| -4| -4| -4| -4| -4| -4| -4| -4| -4| -4| -4| -4| -4| -4|
| c0 | -4| -4| -4| -4| -4| -4| -4| -4| -4| -4| -4| -4| -4| -4| -4| -4|
| d0 | -4| -4| -4| -4| -4| -4| -4| -4| -4| -4| -4| -4| -4| -4| -4| -4|
| e0 | -4| -4| -4| -4| -4| -4| -4| -4| -4| -4| -4| -4| -4| -4| -4| -3|
| f0 | -3| -3| -3| -3| -3| -3| -3| -3| -3| -3| -2| -2| -2| -2| -1| -1|

FIG. 7-B ct2(0-255)

|    | 0  | 1  | 2  | 3  | 4  | 5  | 6  | 7  | 8  | 9  | a  | b  | c  | d  | e  | f  |
|----|----|----|----|----|----|----|----|----|----|----|----|----|----|----|----|----|
| 0  | 0  | 1  | 1  | 1  | 2  | 2  | 2  | 2  | 2  | 2  | 2  | 2  | 3  | 3  | 3  | 3  |
| 10 | 3  | 3  | 3  | 3  | 3  | 3  | 3  | 3  | 3  | 3  | 3  | 3  | 3  | 3  | 3  | 3  |
| 20 | 3  | 3  | 3  | 3  | 3  | 3  | 3  | 3  | 3  | 3  | 3  | 3  | 3  | 3  | 3  | 3  |
| 30 | 3  | 3  | 3  | 3  | 3  | 3  | 3  | 3  | 3  | 3  | 3  | 3  | 3  | 3  | 3  | 3  |
| 40 | 3  | 3  | 3  | 3  | 3  | 3  | 3  | 3  | 3  | 3  | 3  | 3  | 3  | 3  | 3  | 3  |
| 50 | 3  | 3  | 3  | 3  | 3  | 3  | 3  | 3  | 3  | 3  | 3  | 3  | 3  | 3  | 3  | 3  |
| 60 | 3  | 3  | 3  | 3  | 3  | 3  | 3  | 3  | 3  | 3  | 3  | 3  | 3  | 3  | 3  | 3  |
| 70 | 3  | 3  | 3  | 3  | 3  | 3  | 3  | 3  | 3  | 3  | 3  | 3  | 3  | 3  | 3  | 3  |
| 80 | -3 | -3 | -3 | -3 | -3 | -3 | -3 | -3 | -3 | -3 | -3 | -3 | -3 | -3 | -3 | -3 |
| 90 | -3 | -3 | -3 | -3 | -3 | -3 | -3 | -3 | -3 | -3 | -3 | -3 | -3 | -3 | -3 | -3 |
| a0 | -3 | -3 | -3 | -3 | -3 | -3 | -3 | -3 | -3 | -3 | -3 | -3 | -3 | -3 | -3 | -3 |
| b0 | -3 | -3 | -3 | -3 | -3 | -3 | -3 | -3 | -3 | -3 | -3 | -3 | -3 | -3 | -3 | -3 |
| c0 | -3 | -3 | -3 | -3 | -3 | -3 | -3 | -3 | -3 | -3 | -3 | -3 | -3 | -3 | -3 | -3 |
| d0 | -3 | -3 | -3 | -3 | -3 | -3 | -3 | -3 | -3 | -3 | -3 | -3 | -3 | -3 | -3 | -3 |
| e0 | -3 | -3 | -3 | -3 | -3 | -3 | -3 | -3 | -3 | -3 | -3 | -3 | -3 | -3 | -3 | -3 |
| f0 | -3 | -3 | -3 | -3 | -3 | -2 | -2 | -2 | -2 | -2 | -2 | -2 | -2 | -1 | -1 | -1 |

FIG. 7-C

LOSSLESS VIDEO CODING SYSTEMS AND METHODS

RELATED APPLICATION DATA

This application claims the benefit of the filing date of U.S. Provisional Patent Application No. 61/765,261, filed Feb. 15, 2013, which is herein incorporated by reference.

BACKGROUND OF THE INVENTION

The invention relates to video data processing, an in particular to lossless video decoding systems and methods.

Video processing, be it video compression, video decompression, or image processing in general, makes use of large amounts of data which are typically organized in video frames (pictures). Video processing generally requires significant computational resources and memory bandwidth. The computational burden and associated memory bandwidth and power requirements of video processing can be particularly challenging in mobile, battery-operated devices, which are subject to stringent power consumption constraints. In particular, using higher clock frequencies to improve performance may lead to higher power consumption, which may be particularly undesirable in mobile devices. As video resolutions increase to 4 k and beyond, performing video processing, and particularly video decoding, in real time on mobile devices can pose new challenges.

SUMMARY OF THE INVENTION

According to one aspect, an integrated circuit comprises a plurality of speculative video decoding engines configured to perform in parallel a plurality of speculative sample-determination calculations for a current pixel to be decoded, and a multiplexing unit connected to the plurality of speculative decoding engines. Each speculative decoding engine performs one of the plurality of speculative sample-determination calculations. Each speculative sample-determination calculation corresponds to one of a plurality of quantized values of an inter-pixel gradient, the inter-pixel gradient characterizing a difference defined between the current pixel and a pixel immediately adjacent to the current pixel. The multiplexing unit is configured to select a result of a selected speculative sample-determination calculation to be used to generate a sample value for the current pixel. The multiplexing unit selects the result according to a determined value for the pixel immediately adjacent to the current pixel.

According to another aspect, a video decoding method comprises: employing a plurality of speculative video decoding engines integrated on a semiconductor substrate to perform in parallel a plurality of speculative sample-determination calculations for a current pixel to be decoded, each speculative decoding engine performing one of the plurality of speculative sample-determination calculations, each speculative sample-determination calculation corresponding to one of a plurality of quantized values of an inter-pixel gradient, the inter-pixel gradient characterizing a difference defined between the current pixel and a pixel immediately adjacent to the current pixel; and employing a multiplexing unit integrated on the semiconductor substrate and connected to the plurality of speculative decoding engines to select a result of a selected speculative sample-determination calculation to be used to generate a sample value for the current pixel, the multiplexing unit selecting the result according to a determined value for the pixel immediately adjacent to the current pixel.

According to another aspect, a video decoding system comprises: means for performing in parallel a plurality of speculative sample-determination calculations for a current pixel to be decoded, each speculative sample-determination calculation corresponding to one of a plurality of quantized values of an inter-pixel gradient, the inter-pixel gradient characterizing a difference defined between the current pixel and a pixel immediately adjacent to the current pixel; and means for selecting a result of a selected speculative sample-determination calculation to be used to generate a sample value for the current pixel according to a determined value for the pixel immediately adjacent to the current pixel.

BRIEF DESCRIPTION OF THE DRAWINGS

The foregoing aspects and advantages of the present invention will become better understood upon reading the following detailed description and upon reference to the drawings where:

FIG. 2-A shows an exemplary video image decoder including a lossless 2D decoder according to some embodiments of the present invention.

FIG. 2-B shows an exemplary video image encoder including a lossless 2D decoder according to some embodiments of the present invention.

FIG. 5-A illustrates exemplary picture-boundary virtual pixel values according to some embodiments of the present invention.

FIG. 5-B shows an exemplary sample pixel and a number of immediately-adjacent pixels according to some embodiments of the present invention.

FIGS. 7-A-C show three exemplary context tables according to some embodiments of the present invention.

DETAILED DESCRIPTION OF THE INVENTION

The following description illustrates the present invention by way of example and not necessarily by way of limitation. Any reference to an element is understood to refer to at least one element. A set of elements is understood to include one or more elements. A plurality of elements includes at least two elements, and multiple elements refers to at least two elements. Unless otherwise specified, each recited element or structure can be formed by or be part of a single structure or unit, or be formed from multiple distinct structures or units. Unless otherwise specified, any recited connections can be direct connections or indirect operative connections established through intermediary circuit elements or structures. The statement that two or more events or actions happen synchronously is understood to mean that the events/actions happen on the same clock cycle. Unless otherwise specified, the term "coding" refers to encoding and/or decoding. Computer readable media encompass non-transitory (storage) media such as magnetic, optic, and semiconductor media (e.g. hard drives, optical disks, flash memory, DRAM), as well as communications links such as conductive cables and fiber optic links. According to some embodiments, the present invention provides, inter alia, computer systems including at least one processor and/or memory programmed to perform the methods described herein, as well as computer-readable media encoding instructions to perform the methods described herein.

Figure 1:
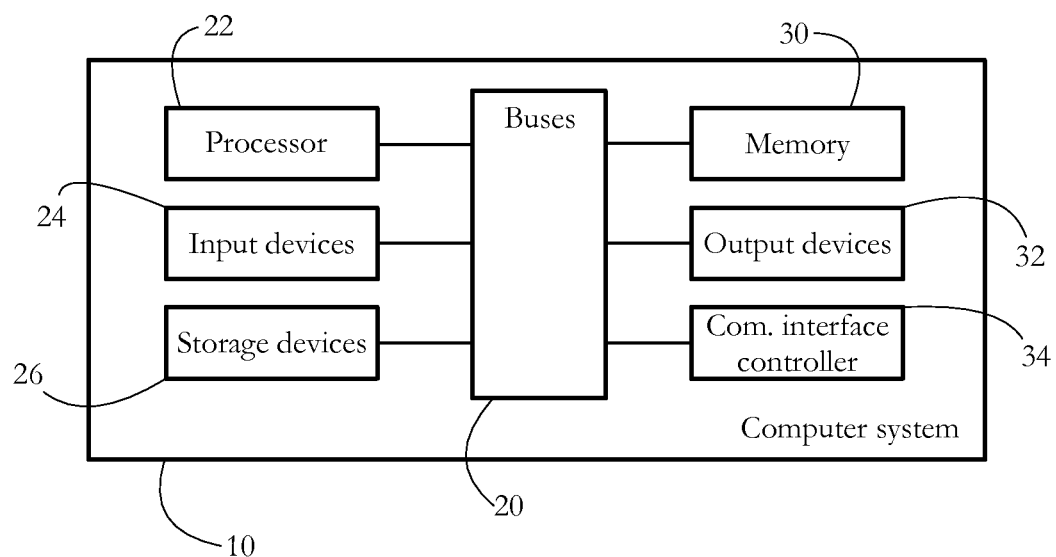
FIG. 1 shows an exemplary video coding (encoding and/or decoding) system including a video prediction cache, according to some embodiments of the present invention.

FIG. 1 shows an exemplary data processing system 10 according to some embodiments of the present invention. One or more buses 20 connect a microprocessor (CPU) 22, memory (e.g. DRAM) 30, input devices (e.g. mouse, keyboard) 24, output devices (e.g. display, speakers, haptic/vibration generator) 32, storage devices (e.g. hard drive, solid state drive) 26, and a communication interface controller (e.g. network interface card) 34. The illustrated computer system 10 may be a server, personal computer, tablet, or mobile communication device (e.g. smartphone) capable of performing video coding (encoding and/or decoding) operations.

Microprocessor 22 may be a general-purpose processor (e.g. a multi-core processor) integrated on a semiconductor substrate and running software implementing a number of system and/or method components as described below. In some embodiments, microprocessor 22 may include dedicated special-purpose hardware units (e.g. cores) implementing in hardware at least some of the system and/or method components described below. In particular, in some embodiments, hardware-implemented video encoders and/or decoders form part of microprocessor 22.

FIGS. 2-A shows an exemplary video image decoder 36, while FIG. 2-B shows an exemplary video image encoder 136 according to some embodiments of the present invention. In some embodiments, at least some of the components shown in FIGS. 2-A and 2-B may be implemented using software running on a general-purpose processor, while at least some components, and in particular the lossless 2D encoding and/or decoding units described below, may be implemented as special-purpose hardware units.

As shown in FIG. 2-A, decoder 36 includes a number of decoder units connected between a video input and a corresponding bitstream output: an entropy decoder (CABAC) unit 40, an inverse quantization unit 44, an inverse transform unit 46, a motion vector unit 48, an intra prediction unit 50, a motion compensation unit 52, a prediction cache 54, a lossless 2D decoder unit 58, a frame storage unit 60, a lossless 2D encoder unit 62, and a loop filter unit 64. Decoder 36 receives a compressed standard-compliant bytestream and outputs pictures in raster order.

As shown in FIG. 2-B, encoder 136 includes a number of encoder units connected between a video input and bitstream output: a video statistics generation unit 140, an intra prediction unit 144, a motion estimation unit 146, a prediction cache 148, a lossless 2D decoder unit 58, a residual determination unit 152, a forward transform unit 154, a forward quantization unit 158, an inverse quantization unit 160, an inverse transform unit 162, a bits estimation unit 164, a rate-distortion optimization unit 166, a frame storage unit 168, a lossless 2D encoder unit 62, a loop filter unit 174, a triage station unit 176, and an entropy encoder (CABAC) unit 178. Encoder 136 receives picture data in raster order and outputs a compressed standard-compliant byte-stream.

In some embodiments, frame storage units 60, 168 may be provided off-die, in external memory. In some embodiments, frame storage units 60, 168 are included on-die (on the same semiconductor substrate) with the other components shown in FIGS. 2-A-B. Such a chip may have most of its die surface taken up by frame memory. Using lossless compression on reference frames in embodiments using on-die frame storage may yield significant advantages, including lower cost, lower power consumption, and higher performance as the encoder/decoder is not limited by the bandwidth available to an external shared memory.

Decoder 36 and/or encoder 136 perform video coding operations according to one or more video coding standards such as MPEG-2, H.264 (MPEG 4 AVC), and/or H.265 (HEVC, or High Efficiency Video Coding). Compared to H.264, HEVC may allow increased compression rates at the same level of quality, or alternatively provide improved video quality at the same bit rate, but generally requires increased computational and memory bandwidth resources.

The description below will focus primarily on lossless 2-D decoder 58, which performs a number of lossless compression operations. Such compression operations allow a reduction in the memory bandwidth required by decoder 36 and/or encoder 136.

Figure 3:
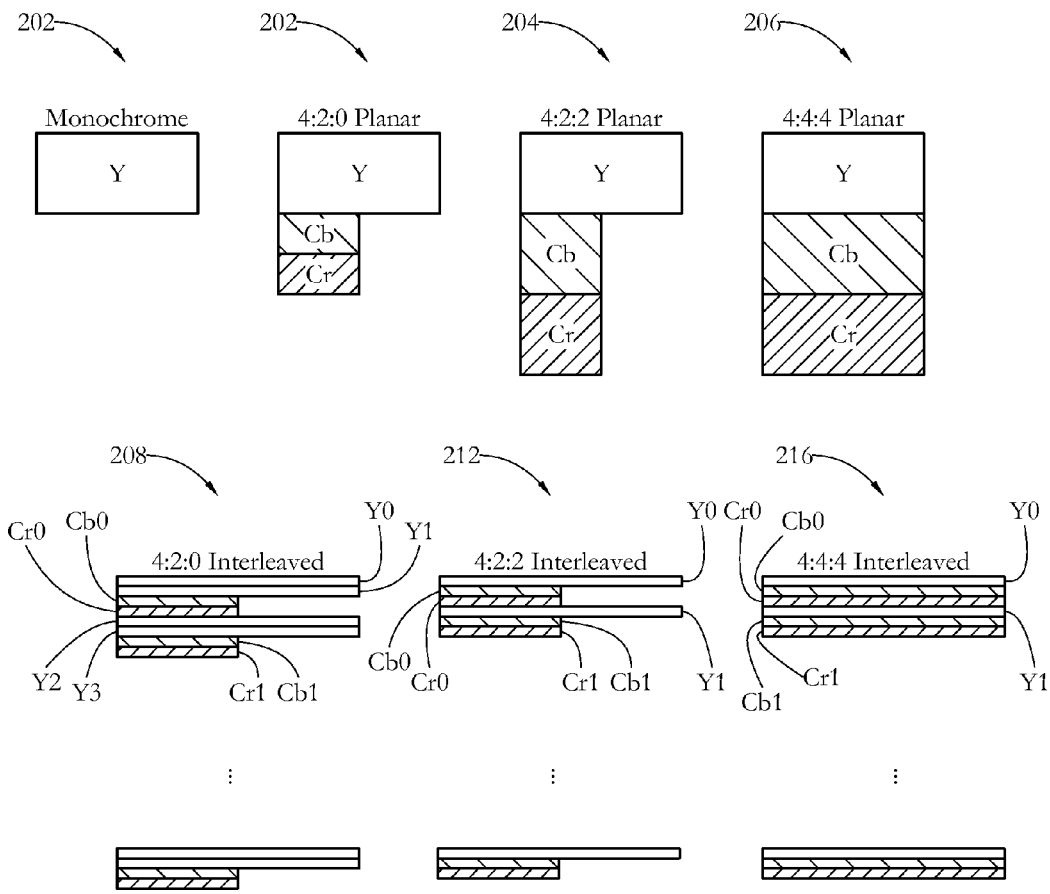
FIG. 3 shows a number of exemplary pixel sequences for different picture formats according to some embodiments of the present invention.

In some embodiments, lossless decoder 58 supports multiple picture formats, including monochrome, 4:2:0, 4:2:2, and 4:4:4 chroma formats, both planar and interleaved. FIG. 3 illustrates a number of exemplary pixel sequences: a monochrome sequence 202, a 4:2:0 planar sequence 202, a 4:2:2 planar sequence 204, a 4:4:4 planar sequence 406, a 4:2:0 interleaved sequence 208, a 4:2:2 interleaved sequence 212, and a 4:4:4 interleaved sequence 216. In FIG. 3, Y denotes luminance (luma), while Cb and Cr denote blue-difference and red-difference chrominance (chroma) components, respectively. In some embodiments, in order to facilitate supporting multiple image formats, decoding systems and methods as described below are reentrant at line boundaries. The ability to interrupt and seamlessly resume execution at each line boundary facilitates multiplexing the decoding of multiple frames and/or tiles. The compressed stream may be padded with 0 bits in case it does not end at a byte boundary. Some implementations may support only 8-bit components.

Figure 4:
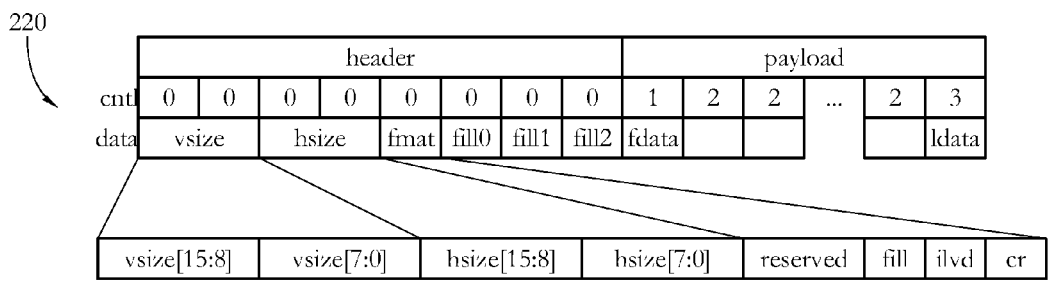
FIG. 4 illustrates an exemplary video coding packet format according to some embodiments of the present invention.

In some embodiments, the picture format and a number of other parameters are specified in header fields forming part of one or more video coding packets. FIG. 4 illustrates the format of an exemplary video coding packet 220 according to some embodiments of the present invention. Packet 220 includes a header 222 and a payload 224, each including control (cntl) and data fields. The control fields identify the corresponding data fields; for example, zeros in the control fields identify header 222 as a header, while control values in the payload identify that start and end of payload data. The data fields of header 222 include horizontal and vertical size fields characterizing the size of the images to be decoded/encoded, a format field, and a plurality of fill fields. The image size fields may be multiples of 4 and be in the ($2^2$, $2^{16}$) range. The format field includes a fill field, an interleave/planar identification (ilvd) field, and a chroma (cr) field. The fill field indicates whether incomplete pictures are to be left truncated or filled-in with fill values (e.g. 6110 for component 0, and fill1 and fill2 for components 1 and 2 of non-monochrome images). The interleave/planar identification (ilvd) field indicates whether the picture data is planar or interleaved. The chroma field (cr) identifies the chroma format from among choices including monochrome, 4:2:0, 4:2:2 and 4:4:4. The payload includes a sequence of data bytes, including a first byte (fdata) and a last byte (last data) in the sequence. In some embodiments, in case a payload ends prematurely, the decoder fills in the missing picture with the fill bytes in case the fill header flag was set, flushes the pipeline, and reinitializes the context. Any payload bytes received after that may be discarded until the next header.

The operation of lossless coding systems/methods according to some embodiments of the present invention may be better understood by considering the generation of a prediction and associated delta value for an exemplary pixel value s of a pixel of interest, as shown in FIGS. 5-A-B. The pixel value s may denote luma, chroma, and/or combinations of luma and chroma, or other values used to convey the color and/or brightness of a given pixel. The pixel value s is determined and encoded/decoded as the sum of a prediction value pred and a difference value delta, wherein at least one of the prediction value and the difference value is subject to a context-specific modulation/adjustment as described below. The prediction value is generated using a predetermined algorithm according to the values of pixels neighboring the pixel of interest, and in particular according to the values of pixels immediately adjacent to the pixel of interest and preceding the pixel of interest in encoding/decoding order. Thus, the prediction value for the present pixel need not be encoded as part of the video bitstream; only the difference value delta is encoded, at the decoder adds the delta value determined from the bitstream data to the predetermined prediction value. Such a differential encoding approach allows encoding differences between actual pixel values and predicted values, rather than encoding the actual pixel values for all pixels. In some embodiments, the difference delta is encoded using context adaptive Golomb-Rice codes. Large values may use escape coding, and sequences of zero delta may be run-length encoded.

FIG. 5-A illustrates exemplary picture-boundary virtual pixel values according to some embodiments of the present invention. Consider a pixel s situated one row and column away from the picture boundary. The value of such a pixel may be predicted according to the immediately-adjacent and preceding pixel values a, b, c and d. For a pixel along the picture boundary, actual immediately-adjacent and preceding pixel values do not exist, and thus virtual values may be used instead. Such virtual values may be set to be zero along the top boundary, and equal to the actual left-boundary values one row above along the left boundary.

FIG. 5-B shows an exemplary sample pixel and a number of immediately-adjacent pixels used to generate a prediction for the sample pixel according to some embodiments of the present invention. A baseline prediction for the sample pixel may be generated according to the values of the pixels immediately adjacent the sample pixel, and in particular the top-left (TL), top (T), top-right (TR), and left (L) pixels immediately adjacent the sample pixel. In some embodiments, a baseline prediction pred may be set by applying a median filter to immediately-adjacent pixel values, for example by setting the prediction pred to be the median of the three values (L, T, L+T−TL). Other prediction values representative of the values around the sample pixel may be used in some embodiments.

In some embodiments, the values surrounding the sample pixel may be used to define a context of the sample pixel. Such a context may describe the visual appearance of an image region of the sample pixel, as characterized by a set of gradients around the sample pixel. For example, a flat image region (e.g. a patch of blue sky) may be characterized by a context similar to other flat image regions, and different from other highly-textured and/or rapidly-varying regions (e.g. grass or shimmering water). A given context may be thought to characterize the texture of an area.

In some embodiments, the context of a sample pixel is defined according to three context values $ct0$, $ct1$, and $ct2$ characterizing a gradient (a set of spatial differences) around the sample pixel. The context values $ct0$, $ct1$ and $ct2$ for a sample S may be set to quantized values of (L−TL), (TL−T), and (T−TR) respectively. Quantization allows reducing the storage required for storing contexts. In some embodiments, the contexts $ct0$, $ct1$ and $ct2$ are quantized to 5, 9 and 7 levels, respectively, which yields 5*7*9=315 luma contexts and 315 chroma contexts. Other numbers of quantization levels, for example other numbers between four and sixteen, may be used in some embodiments. Fewer quantization levels require less context storage, while more quantization levels allow a finer and more accurate characterization of the sample pixel context. In some embodiments, values other than L−TL, TL−T and T−TR may be used to characterize the context of a sample pixel, and in particular various gradients in the area of the sample pixel.

In some embodiments, a number of statistics are maintained for each defined context, including count, drift, error and bias statistics. Such context statistics are built on past decoding outcomes. Near history may be weighted more than older history. To facilitate such weighting, a count variable is used to reduce the weight of history older than a predetermined threshold. For example, the weight of history older than 128 pixels may be cut in half, leading to an exponential attenuation of the impact of older decoding outcomes. In some embodiments, the count variable is initialized at 1 and is incremented for every decoded pixel; when count reaches 128, it is halved to 64, and the weights of the drift and error variables described below are halved as well.

In some embodiments, drift is the accumulation of the decoded bitstream values, and error is the absolute value of drift. Ideally, the decoded bitstream values are zero or close to zero. If the decoded bitstream values are consistently high (or consistently low), appropriate adjustments may be made to bring the bitstream values closer to zero. The error value may be used to alter how residual data is encoded using Golomb-Rice codes, which are used for variable-length encoding. The larger the error, the more the Golomb-Rice codes are skewed toward larger numbers, i.e. larger numbers are encoded using fewer bits.

In some embodiments, a bias variable is incremented whenever the average drift over the last "count" pixels is larger than one, and is decremented whenever the average drift is less than negative one. When bias is changed, a count correction with the opposite sign is made to the drift statistics, to avoid incrementing/decrementing bias repeatedly due to the same drift statistics. In some embodiments, the bias variable may be limited to the [−128, +127] range. The context-dependent bias value may be used to perform a context-dependent adjusting by adding the bias value to the baseline prediction, or alternatively to the decoded bitstream value, to generate a final sample value, as described below.

In some embodiments, the context of a given pixel, and in particular the statistics maintained for that context, are used to modulate or adjust a baseline prediction generated using a median filter as described above. In other words, a modulated/adjusted prediction may be generated by adding a baseline prediction (e.g. a baseline generated by a median filter) and a correction term determined according to context-specific statistics. For example, a baseline prediction value may be adjusted by adding the context-specific bias value described above. In some embodiments, a context-dependent modulation may be applied to a difference decoded from the input bitstream, instead of or in addition to a context-dependent modulation applied to the baseline prediction described above.

In some embodiments, multiple computations of a prediction pred and/or a context-dependent modulation for a sample pixel are performed in parallel for multiple context values corresponding to different quantized values of L–TL. Such parallel computations may be performed before the actual value of L becomes available to the decoder. Once the value L (and thus L–TL) becomes available, the correct prediction and/or context-dependent modulation is/are selected for use in determining the final sample value. The final sample value is determined by adding the baseline prediction, the context-dependent modulation, and the difference value decoded from the input bitstream.

Figure 6:
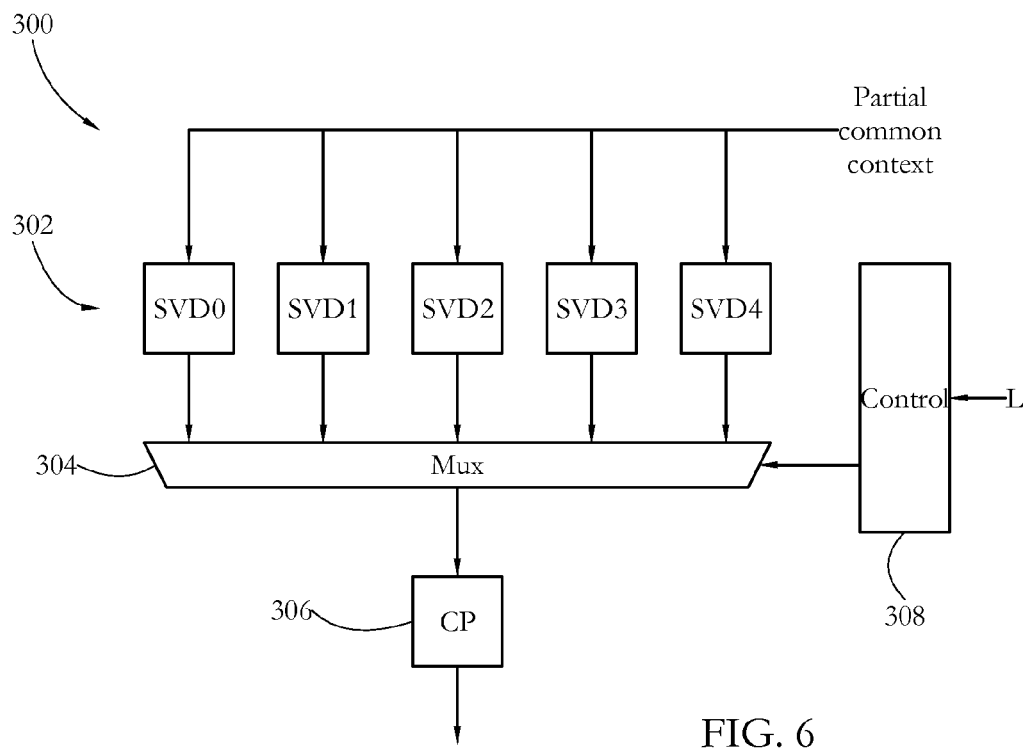
FIG. 6 illustrates the structure of an exemplary speculative video decoding engine according to some embodiments of the present invention.

FIG. 6 shows an exemplary speculative video decoding unit 300 according to some embodiments of the present invention. Video decoding unit 300 includes a plurality of parallel video decoding engines 302, each performing a set of sample-determination calculations for a current pixel to be decoded (current sample) according to a received partial context of the present sample and a speculative, predetermined context remainder. The outputs of video decoding engines 302 are connected to a multiplexer 304, which selects one of the outputs when the full context of the present sample becomes available. A common processing unit 306 is connected to the output of multiplexer 304, and performs additional processing on the data output by multiplexer 304. A control unit 308 is connected to a control input of multiplexer 304, and controls the selection operation performed by multiplexer 304 according to received context data, and in particular according to according to a determined value for the pixel immediately adjacent to the current pixel.

Each speculative sample-determination calculation performed by a video decoding engine 302 corresponds to one of a plurality of quantized values of an inter-pixel gradient. The inter-pixel gradient characterizes a difference defined between the current pixel and a pixel immediately adjacent to the current pixel. In particular, in some embodiments, each video decoding engine 302 corresponds to one of five quantized values of the context ct0, which in turn depend on the value of left pixel L, which may not be yet decoded or otherwise available. Once the actual value of the left pixel L becomes available, control unit 308 determines the corresponding context ct0 according to L–TL, and controls multiplexer 304 accordingly to select the corresponding video decoding engine output.

FIGS. 7-A-C show three exemplary context lookup tables for ct0, ct1, and ct2, respectively, according to some embodiments of the present invention. The table coordinates represent context a context index given by the gradient of the neighboring pixels computed in $GF(2^8)$, i.e. modulo 256, while the value inside each table cell represents a quantized context value. In the illustration in FIG. 7-A, the context ct0 is quantized to five values, shown illustratively as (−2, −1, 0, 1, and 2), corresponding to five possible quantized differences between L and TL. Each of the five quantized values is used by a corresponding speculative video decoding engine 302 (FIG. 6) to compute a context-dependent modulation before the value of L is known. As shown in FIG. 7-B, the context ct0 is quantized to nine values, shown illustratively as (−4, −3, −2, −1, 0, 1, 2, 3, 4), corresponding to nine possible quantized differences between TL and T. As shown in FIG. 7-C, the context ct2 is quantized to seven values, shown illustratively as (−3, −2, −1, 0, 1, 2, 3), corresponding to seven possible quantized differences between T and TR. In embodiments using such tables, each sample may be characterized by a context having a total of 5*7*9=315 context values (or classes) for luma and 315 context values for chroma. In some embodiments, positive and negative contexts may be aliased to cut in half the context memory to 158 luma and 158 chroma memory locations, with negligible degradation of compression performance. Each memory location may hold corresponding context-specific statistics described above (bias, count, drift, error).

Figure 8:
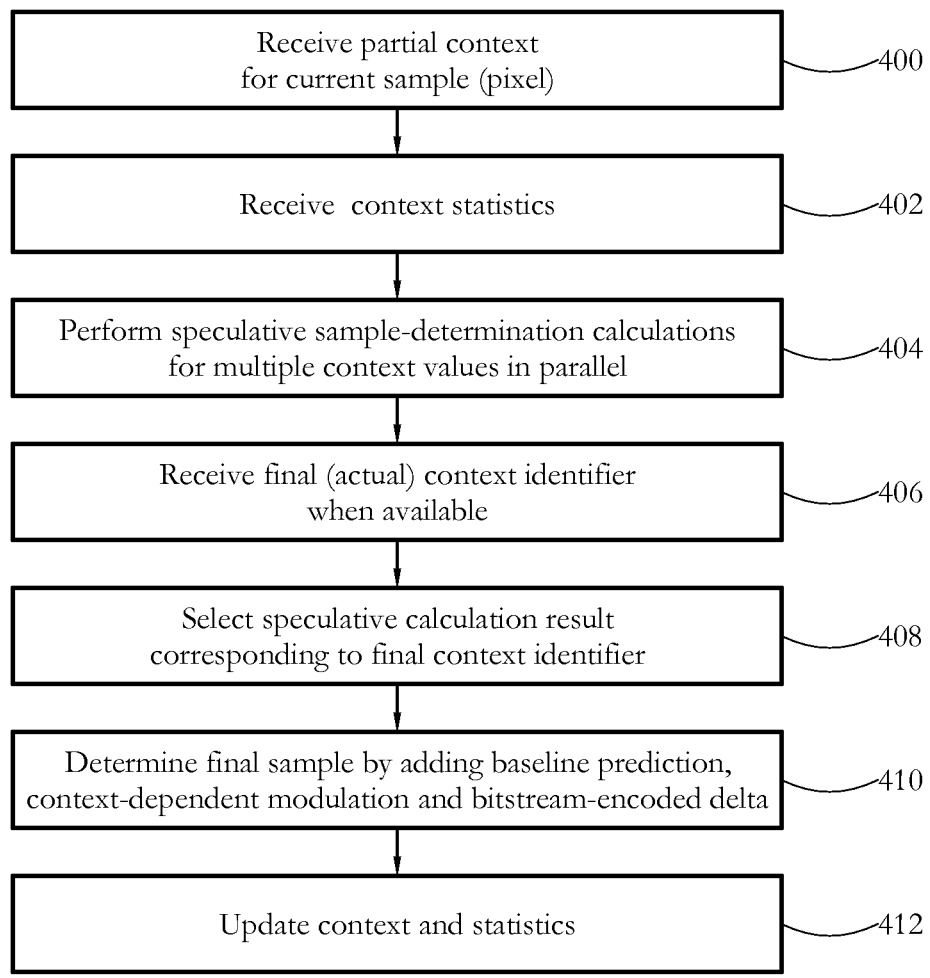
FIG. 8 is a flowchart illustrating a sequence of steps performed by a lossless 2D decoder according to some embodiments of the present invention.

FIG. 8 shows a flowchart illustrating a sequence of steps performed by lossless 2D decoder according to some embodiments of the present invention. In a step 400, a partial context for the current sample (pixel to be decoded) is received by one or more components of the lossless 2D decoder, and in particular by each speculative video decoding engine 302 (FIG. 6). For example, the luma and chroma values for the immediately-neighboring pixels TL, T and TR (FIG. 5-B) may be already known, and the partial context may include indicators of the values of TL, T and TR, and/or the ct1 and ct2 context values. The luma and chroma values for the immediately neighboring pixel L and ct0 context value may not be known yet. In a step 402, each speculative decoding engine 302 receives context statistics for the known partial context and the possible (speculative) context remainder corresponding to that speculative decoding engine.

In a step 404, speculative decoding engines 302 perform speculative sample-determination calculations for multiple context values in parallel. Each of the five speculative decoding engines 302 performs calculations corresponding to one of five possible quantized values of the context remainder ct0. As noted above, such speculative calculations performed by one decoding engine 302 may include applying a median filter for a given value of L to determine a possible baseline prediction, and/or determining a context-specific adjustment according to the context-specific statistics corresponding to one of the possible five contexts ct0.

In a step 406, control unit 308 (FIG. 6) receives or otherwise determines an identifier of the actual value of L and/or the corresponding context ct0, and accordingly controls multiplexer 304 to select the output of a corresponding speculative decoding engine 302 for further processing (step 408).

In a step 410, common processing unit 306 (FIG. 6) receives or otherwise determines a baseline prediction, a context-dependent modulation, and a bitstream-encoded difference (delta) for the current sample, and adds the three components to generate final luma and/or chroma values for the current sample. In a step 412, common processing unit 306 updates the stored context data to reflect the now-known values of L and the present sample, and the resulting updated context statistics.

The exemplary lossless decoding systems and methods described above allow reducing the memory bandwidth required for processing two-dimensional sets of data such as pictures. The compression performance of exemplary methods in some embodiments may be about 2× better than that of gzip. Such an improved performance may be achieved by reducing the 2D spatial redundancy of the algorithm. In some embodiments the compression ratio may be 2× to 8×, with an average of 4×.

In some embodiments, the throughput of the encoder input and decoder output is one pixel component per cycle with a latency of 9 cycles for the encoder and 4 cycles for the decoder. In some embodiments, the encoder logic size is approx. 11 Kgates, the decoder logic size is approx. 33Kgates, and the SRAM size is 11 Kbits plus one line buffer for each. One encoder/decoder pair for 1920×1080 pictures may be approx 0.1 mm2 in 40 nm TSMC process, placed and routed, including scan and BIST, and it may be capable of running at least up to 200 MHz in a low power process using only high-Vt cells, i.e. it may be capable of sustaining a bandwidth of at least 200 Mbytes/sec. In some embodiments, 1 GHz operation is possible in a G process, with a mix of high, regular, and low Vt cells, thus achieving a sustained bandwidth of 1 Gbytes/sec. In case a higher throughput is desired, a separate encoder/decoder can be used for luma and chroma. In such a case, the amount of logic may double, but the the total SRAM may stay the same.

Exemplary systems and methods according to some embodiments of the present invention exploit the spatial redundancy found in pictures. Such an exemplary algorithm may maintain 158 contexts for luma and 158 for chroma. In some embodiments, only line buffer may be used in order to minimize the amount of SRAM required. To compensate for such a relatively-small spatial context, the values of the surrounding pixels may be used to make the coding systems/methods context-adaptive. The combination of a small spatial context and a relatively large set of local contexts offer such a coding engine the ability to detect and lock to local textures.

In some embodiments, an exemplary encoder/decoder as described above may support horizontal (HS) and vertical (VS) sizes between 256 and 65536, with defaults of 1920 and 1088, respectively, and a data width (DW) of the picture component of 8. In some embodiments, a decoder may employ two internal static random access memory (SRAM) units: a single-port line buffer organized as HS×(2*DW) (default 1920×16), and a 2-port context memory organized as 64×180. The line buffer may be sized to support 4:2:0 and 4:2:2 interleaved pictures with a horizontal size of at most HS. Monochrome and planar pictures may be supported up to a horizontal size of twice HS, and 4:4:4 interleaved pictures up two thirds of HS. For example, for HS=1920, the maximum supported horizontal size may be 1920 for 4:2:0 and 4:2:2 interleaved, 3840 for mono-chrome and planar, and 1280 for 4:4:4 interleaved pictures.

The above embodiments may be altered in many ways without departing from the scope of the invention. Accordingly, the scope of the invention should be determined by the following claims and their legal equivalents.

What is claimed is:
1. An integrated circuit, comprising:
a plurality of video decoding engines configured to perform, in parallel, a plurality of sample-determination calculations for a current pixel to be decoded to generate a plurality of results, wherein a particular decoding engine is configured to perform a particular sample-determination calculation of the plurality of sample-determination calculations,
wherein the particular sample-determination calculation corresponds to a particular quantized value of a plurality of quantized values of an inter-pixel gradient, characterizing a difference defined between the current pixel and a pixel adjacent to the current pixel; and
a multiplexing unit connected to the plurality of decoding engines, wherein the multiplexing unit is configured to select a particular result of the plurality of results using a determined value for the pixel adjacent to the current pixel.

2. The integrated circuit of claim 1, wherein the integrated circuit further comprises a processing unit configured to generate a sample for the current pixel according to a baseline prediction for the current pixel, a context-based adjustment determined according to a set of statistics for a context of the current pixel, and a delta value decoded from an input bitstream.

3. The integrated circuit of claim 2, wherein to perform, in parallel, the plurality of sample-determination calculations, the plurality of video decoding engines are further configured to determine a plurality of context-based adjustments, each corresponding to a context of the current pixel.

4. The integrated circuit of claim 2, wherein the processing unit is further configured to determine the baseline prediction for the current pixel using a median filter applied to pixels adjacent to the current pixel.

5. The integrated circuit of claim 2, wherein the set of statistics include a set of bias statistics characterizing prior context-based adjustments made for the context of the current pixel.

6. The integrated circuit of claim 1, wherein the pixel adjacent to the current pixel is a pixel to the left of the current pixel.

7. The integrated circuit of claim 1, wherein each of the plurality of video decoding engines is further configured to perform a sample-determination calculation according to quantized values of a plurality of inter-pixel gradients characterizing pixels adjacent to the current pixel.

8. The integrated circuit of claim 7, wherein the plurality of inter-pixel gradients are quantized to different numbers of quantization levels.

9. The integrated circuit of claim 7, wherein the plurality of inter-pixel gradients includes:
a first gradient characterizing a difference between a pixel to the left of the current pixel and a pixel to the top-left of the current pixel;
a second gradient characterizing a difference between a pixel above the current pixel and a pixel to the top-right of the current pixel; and
a third gradient characterizing a difference between the pixel above the current pixel and a pixel to the top-left of the current pixel.

10. The integrated circuit of claim 1, wherein the integrated circuit further comprises a processing unit configured to determine within one clock cycle a sample value for the current pixel to be decoded.

11. A video decoding method, comprising:
performing, in parallel, by a plurality of video decoding engines integrated on a semiconductor substrate, a plurality of sample-determination calculations for a current pixel to be decoded to generate a plurality of results, wherein performing, in parallel, by the plurality of video decoding engines, includes performing, by a particular decoding engine, a particular sample-determination calculation of the plurality of sample-determination calculations;
wherein the particular sample-determination calculation corresponds to one of a plurality of quantized values of an inter-pixel gradient, characterizing a difference defined between the current pixel and a pixel adjacent to the current pixel; and
selecting, by a multiplexing unit integrated on the semiconductor substrate and coupled to the plurality of decoding engines, a particular result of the plurality of results using a determined value for the pixel adjacent to the current pixel.

12. The method of claim 11, further comprising generating a sample for the current pixel is generated according to a baseline prediction for the current pixel, a context-based adjustment determined according to a set of statistics for a context of the current pixel, and a delta value decoded from an input bitstream.

13. The method of claim 12, wherein performing the plurality of sample-determination calculations includes determining a plurality of context-based adjustments, each corresponding to a context of the current pixel.

14. The method of claim 12, further comprising determining the baseline prediction for the current pixel by applying a median filter to pixels adjacent to the current pixel.

15. The method of claim 12, wherein the set of statistics include a set of bias statistics characterizing prior context-based adjustments made for the context of the current pixel.

16. The method of claim 11, wherein the pixel adjacent to the current pixel is a pixel to the left of the current pixel.

17. The method of claim 11, wherein performing, in parallel, by of the plurality of video decoding engines, the plurality of sample-determination calculations includes performing a sample-determination calculation according to quantized values of a plurality of inter-pixel gradients characterizing pixels adjacent to the current pixel.

18. The method of claim 17, wherein the plurality of inter-pixel gradients are quantized to different numbers of quantization levels.

19. The method of claim 17, wherein the plurality of inter-pixel gradients includes:
   a first gradient characterizing a difference between a pixel to the left of the current pixel and a pixel to the top-left of the current pixel;
   a second gradient characterizing a difference between a pixel above the current pixel and a pixel to the top-right of the current pixel; and
   a third gradient characterizing a difference between the pixel above the current pixel and a pixel to the top-left of the current pixel.

20. The method of claim 11, determining, within one clock cycle, a sample value for the current pixel to be decoded.

* * * * *